March 24, 1942.   C. E. SWENSON   2,277,613
METHOD OF PROCESSING AUTOMOBILE PROPELLER SHAFTS
Filed Aug. 12, 1939   3 Sheets-Sheet 1
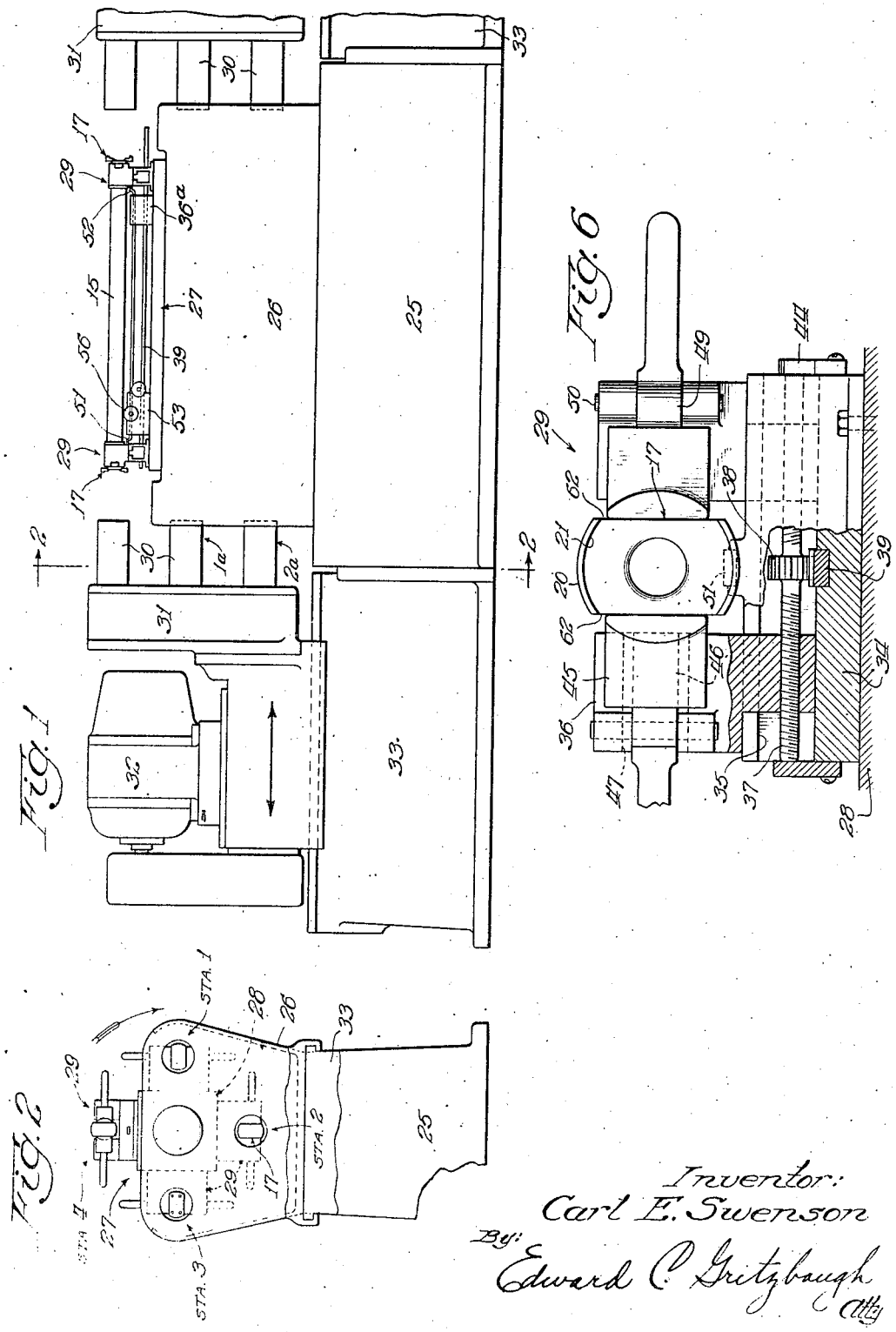
Inventor:
Carl E. Swenson
By: Edward C. Gritzbaugh
Atty March 24, 1942.   C. E. SWENSON   2,277,613
METHOD OF PROCESSING AUTOMOBILE PROPELLER SHAFTS
Filed Aug. 12, 1939   3 Sheets-Sheet 2

Inventor:
Carl E. Swenson
By: Edward C. Gritzbaugh
Atty.

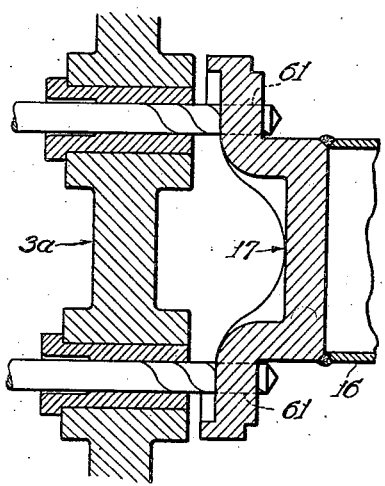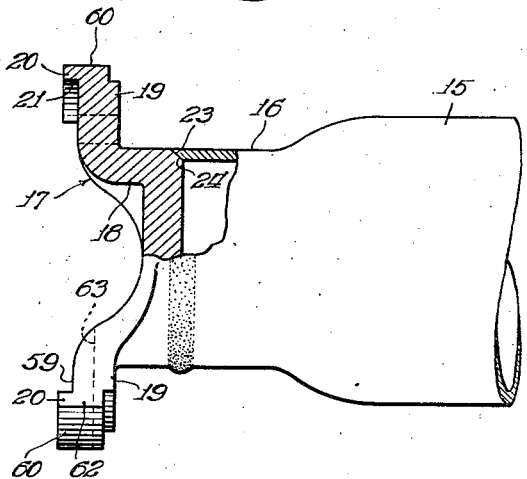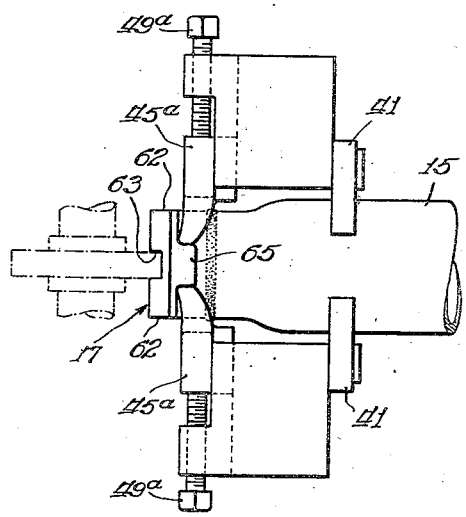

Patented Mar. 24, 1942

2,277,613

UNITED STATES PATENT OFFICE 2,277,613

METHOD OF PROCESSING AUTOMOBILE PROPELLER SHAFTS

Carl E. Swenson, Rockford, Ill., assignor to Borg-Warner Corporation, Chicago, Ill., a corporation of Illinois Application August 12, 1939, Serial No. 289,764

7 Claims. (Cl. 29—152)

This invention relates to the processing of motor vehicle propeller shaft assemblies and has as its primary object to provide an improved method of forming a propeller shaft and universal joint yoke assembly having a high degree of accuracy and therefore being in good static and dynamic balance.

In the past it has been customary, in the manufacture of propeller shaft assemblies, to complete all machining operations on the yoke prior to the welding of the yoke to the tubular shaft, there being usually one yoke on each end of the shaft. Such machining operations, on a yoke of an improved type having arcuate locating shoulders, include quite a number of separate machining operations all directed to the purpose of finishing all surfaces as nearly concentric with the common axis of rotation, as is possible to obtain by careful workmanship. In each of the succeeding machining operations, it is necessary to center the yoke with relation to the surfaces previously machined in order to obtain the desired concentricity. It is difficult to completely avoid error in such succeeding centering operations. According to this prior practice, when the machining of the yoke is completed, it is welded to the propeller tube. The heat produced during the welding operation causes the metal to expand and such expansion tends to cause the yoke to adhere to the tube in a somewhat off-center or out of plane position, particularly in view of the fact that the welding does not take place simultaneously throughout the entire circumference.

The present invention aims to completely eliminate the error introduced by such welding operation performed subsequent to machining the yoke.

Under practice prior to my invention it was necessary to put each propeller tube assembly through a balancing operation wherein the tube was straightened to compensate for any eccentricity or warping introduced during or prior to the welding, until the desired degree of static and dynamic balance was attained. This straightening and balancing operation required considerable time of a very highly skilled operator, and expensive balancing instruments of large size capable of accommodating an entire propeller shaft assembly.

My invention has as its object to reduce the necessity for this balancing operation.

To the attainment of the foregoing objects, the invention contemplates a method wherein the propeller tube is first straightened, the unmachined universal joint yoke or yokes are then welded to its respective ends, the assembly is then placed in a fixture and centered therein with respect to the tools for machining the yoke, and the various steps of the machining operation are then performed while the assembly remains located in the fixture.

An important feature of the invention is the utilization of the exterior cylindrical surface of the tube as the locating surface for centering the assembly in the fixture. Where the tube is of the type in which the ends are reduced, the locating is performed against the enlarged diameter of the tube. This is important, particularly in view of the fact that the reduction of the ends of the tube is customarily performed by a swaging operation, which is not sufficiently accurate to insure the reduced ends remaining exactly concentric with the unreduced region of the tube. Accordingly, at the end of the machining operations, the machined surfaces of the yokes will be concentric with the exterior surface of the major portion of the tube, irrespective of the concentricity of the reduced portion, and thus a maximum degree of balance will be obtained.

Other objects, the advantages and uses of the invention will become more apparent after reading the following specification and claims, and after consideration of the drawings forming a part of the specification, wherein:

Fig. 1 is a front elevation of a machine in which the machining operations of the invention may be carried out;

Fig. 2 is a transverse vertical sectional view thereof taken as indicated by the line 2—2 of Fig. 1;

Fig. 6 is a transverse sectional view taken as indicated by the line 6—6 on Fig. 4;

Fig. 7 is an axial cross-sectional view through the yoke and drilling mechanism.

Fig. 8 is a view partly in section of one end of the finished propeller tube assembly;

Fig. 9 is a plan view of a modified form of the locating and clamping unit;

Figure 3:
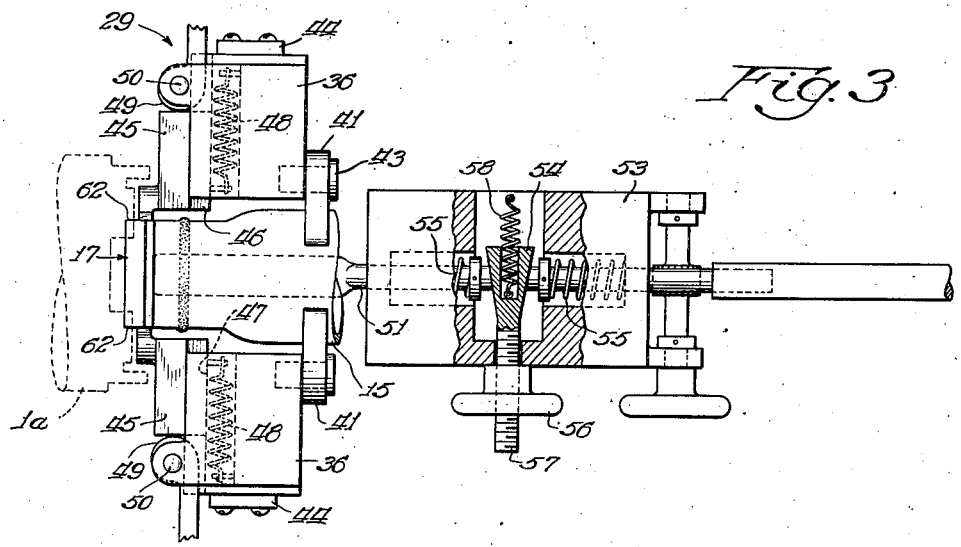
Fig. 3 is a plan view of one of the locating and clamping units and the control arrangements therefor.

As one example of an article produced in accordance with the invention, I have shown in Fig. 8 an end portion of a propeller tube assembly for motor vehicles, including a propeller tube 15, the end of which is reduced as at 16 by a suitable rolling or swaging process, and a universal joint yoke 17 welded to the reduced end 16.

The invention contemplates that the yoke 17 may be formed by stamping from heavy plate or bar stock, the hub portion 18 being drawn to one side of the plane of the intermediate arm portions 19, and the end regions being drawn to the other side of the plane of the arm portions 19 to form flanges 20 which provide internal arcuate bearing shoulders 21 against which the trunnion bearing cups of the universal joint may be located as taught in my Patent No. 1,985,669, dated December 25, 1934.

The hub portion 18 is provided with a beveled surface 23 which, just prior to the welding operation, is adapted to pilot in the beveled mouth 24 of the tube 15, thereby accurately centering the yoke with respect to the tube, in accordance with the disclosure of my copending application.

The complete process of manufacturing the propeller tube assembly includes the following steps:

A section of tubing of the proper diameter and length is selected; the ends may or may not be swaged or rolled to provide the reduced regions 16, and the tube is then straightened.

The ends of the tube are machined to produce the beveled mouth 24, and the tube is then ready to be welded to a yoke or a pair of yokes.

The yokes 17 are formed to rough shape, by a conventional forging operation, or by the improved and simplified step of die stamping mentioned above. The beveled face 23 is formed during this rough forming operation, and is not machined prior to welding.

After being properly prepared for welding, the tube and fitting 17 are assembled in a welding machine and welded under axial pressure which forces the yoke to center itself with respect to the tube as a result of the piloting action of the beveled faces 23 and 24.

After the welding operation is complete, the assembly is transferred to the machine shown in Fig. 1 or any suitable mechanism for performing the machining operations which will hereinafter be described. An important feature of the installation of the assembly in the finishing machine is the location of the longitudinal axis of the tube in exact registry with the axis of the cutting tool which performs each machining operation. This may be accomplished by various mechanisms and it is to be understood that the mechanism which will now be described is merely illustrative of one type of mechanism capable of accomplishing that result.

Fig. 1 shows a plural-station duplex boring machine which is largely of conventional construction. Upon a central base 25 is mounted a housing 26 within which the work holding fixture, indicated generally at 27 is mounted. The fixture 27 comprises a reel 28 having a number of sides corresponding to the number of stations of the machine, and a pair of locating and clamping units, indicated generally at 29, mounted on each of said sides. The entire reel is rotated intermittently by any suitable conventional indexing mechanism, so as to successively advance the several propeller tube assemblies, supported between the respective pairs of clamping units 29, successively to the several operating stations, three being indicated on the drawings as "Sta. 1," "Sta. 2," and "Sta. 3," respectively.

For each of the operating stations, Nos. 1, 2 and 3, there is provided a pair of tool spindles 30, one for each end of the propeller tube assembly, the spindles 30 extending into the housing 26 and carrying the several tools a (Fig. 3) for performing the several operations which will hereinafter be described. The spindles 30 are driven, through suitable gearing indicated schematically at 31, from motors 32 mounted upon end bases 33.

Referring now to Figs. 3, 4, 5, 6 and 7, the clamping units 29 each comprise a base 34 secured to a face of the reel 28, and provided with guideways 35 extending transversely with respect to the longitudinal axis of the reel.

In the ways 35 are mounted a pair of brackets 36 which are adapted to be advanced and retracted toward and from each other by means of an adjusting screw 37 having right and left-hand threads threaded into the respective brackets. Each screw 37 is formed centrally with a pinion 38 which meshes with a rack 39 slidably mounted in a base 34. For each pair of holding units 29 there is a pair of aligned racks 39, which may be spread apart and moved together by any suitable operating mechanism, such as that shown in Fig. 4 which will be described hereinafter with reference to another part of the machine, or by means of a conventional hydraulic mechanism. Instead of a pair of racks, if desired a single rack operating both adjusting screws 37 may be employed.

Each bracket 36 carries a jaw 41 having diverging faces 42 adapted to engage the surface of the tube 15. The jaws 41 are pivoted as at 43 to the brackets 36 so that they may adjust themselves to the tube 15. The jaws 41 serve to accurately position the tube 15 in alignment with a pair of spindles 30. This may be accomplished by employing the adjusting screw 37 as means for maintaining the brackets 36 at equal distances at all times from the projected axis of the spindles 30 at each station. Any suitable means, such for example, as the bearing plates 44 against which the ends of the screw 37 abut, may be employed to maintain the screws in position. The threads of the screw being of equal pitch, the increments of adjustment will always be the same.

Maximum accuracy of centering of the tube is obtained by locating against the maximum diameter of the tube as shown. Even though some inaccuracy may exist in the swaged reduced end portion 16, which inaccuracy will be transmitted to the yoke, the error will be removed, insofar as the yoke is concerned, during the machining operation.

The invention contemplates the engagement of the tube 15 between the jaw 41 under only light pressure, sufficient to obtain the desired location of the tube in axial alignment with the tools, but insufficient to cause any distortion in the tube which usually has a relatively thin wall. The invention further contemplates the elimination of any possibility of setting up of distortion in the tube as a result of the pressure of the tool against the yoke during the machining operation. Accordingly, the yoke is supported between clamping jaws 45 which are adapted to rigidly resist the maximum pressure developed by the tool against the yoke. The jaws 45 are mounted in the respective brackets 36 for sliding movement transversely of the axis of, and in the plane of the yoke 17, by any suitable slide connection such as the dove tail slides 46 received in ways 47 formed on the bracket 36. The jaws 45 may be advanced into engagement with the side faces 62 of the yoke 17, against the pull of the retractor springs 48, by any suitable means such as the cam devices 49 pivoted at 50 in the brackets 36 and adapted to withstand the pressure transmitted back to them through the jaws 45, without slipping. It is to be understood that the showing of the cam devices 49 is merely for purpose of illustration and that the invention contemplates the employment of any suitable means for advancing and holding the jaws 45 in engagement with the yoke 17 such as for example, the set screws 49a of Fig. 9.

Figure 4:
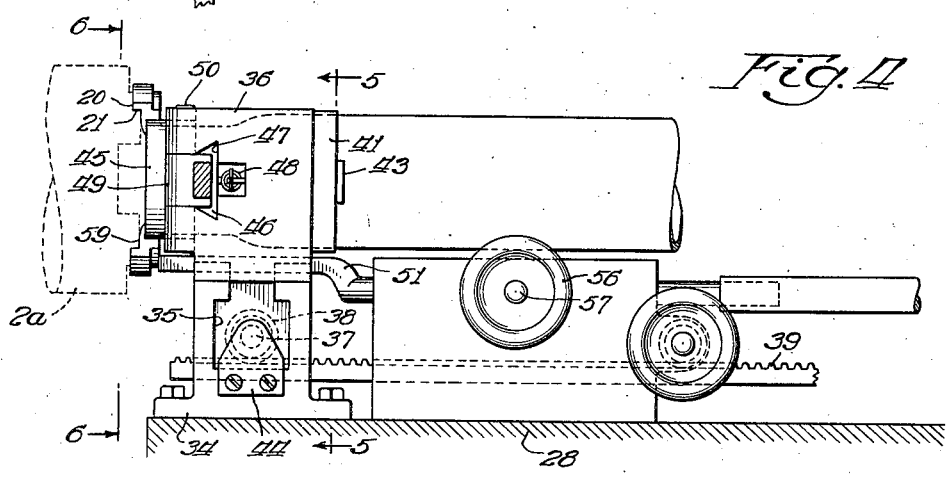
Fig. 4 is a front elevation of the same.
Figure 5:
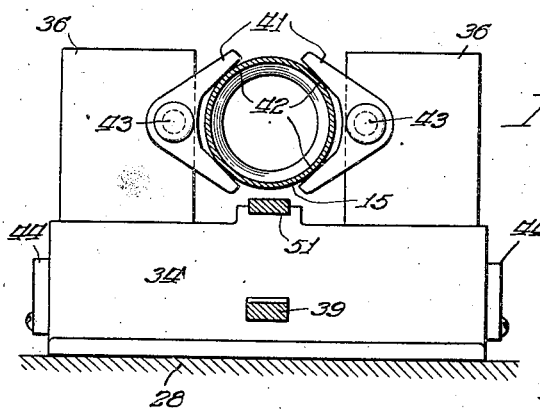
Fig. 5 is an end elevation of the same taken substantially on the line 5—5 of Fig. 4.

In order that the depth of cut may be the same at both ends of the propeller tube assembly, I provide means for adjusting the propeller tube assembly axially to a position wherein it is centered between the cutting tools. Such mechanism includes a pair of push rods 51 and 52 each having one end slidably extended through bracket 36a and its other end slidably mounted in an adjuster housing 53. The remote ends of the push-rods are adapted to engage respective yokes 17 as shown in Fig. 4 and the adjacent ends, within the adjuster housing 53, are adapted to coact with a wedge 54 and to thereby be spread apart against the compression of retractor springs 55, when the wedge 54 is moved transversely between them. Any suitable means for moving the wedge 54 may be provided, such as for example a hand wheel 56 threaded upon a screw 57 forming an extension of the wedge. The wedge may be retracted by means of a spring 58.

The machine indicated in Figs. 1 and 2 may include any number of stations, there being a tool for performing an operation located at each station, the number of stations being dependent upon the number of separate machine operations desired for the particular yoke assembly to be operated upon. In the structure shown in Figs. 1 and 2 for purposes of illustration there are indicated four stations. At station No. 1, I have indicated a rough cutting tool 1—a in Fig. 3 for rough-turning the interior surface 21 of the arcuate shoulder 20, the faces 59 of the arms 19 of the yoke, and the exterior diameter 60 of the shoulders 20 (see Figs. 3 and 8). At station 2 there is located a finish cutter 2—a, indicated in Fig. 4 for finish turning the faces 59 and 21. At station 3 there is located a drill assembly 3—a shown in Fig. 7, for drilling bolt openings 61.

The loading operation, which is performed at station No. 4, includes the steps of separating the jaw carrying brackets 36, removing the finished piece of work, inserting an unfinished tube assembly between the jaws, closing the jaws 41 against the tube 15, under light pressure, and finally advancing the jaws 45 into snug engagement with the yoke 17 without exerting sufficient pressure thereagainst to set up any distortion in the assembly.

The reel 28 may then be indexed to bring the fresh tube assembly to station No. 1, where the rough turning tools 1—a are advanced against the respective yokes 17 and perform the rough turning operations mentioned above. During such turning operations, the pressure of the tools against the work is taken by the jaws 45 and transmitted through the cams 49 to the brackets 36 and then to the base 34.

The assembly which we are following is then indexed to station No. 2, where the surfaces 21 and 59 are turned by the tool 2a, to finish the same.

The assembly is then indexed to station No. 3, where the holes 61 are bored by the tool 3a.

The assembly is then indexed to station No. 4, where it is removed from the machine.

Subsequent to the removal, the tube assembly may be centered up in another fixture where it is subjected to a broaching or milling operation for machining the side faces 62 of the yoke arms 19. At the same time, or while the assembly remains in the same fixture, key receiving slots 63 may be machined centrally through the shoulders 20.

The invention contemplates, as an alternative arrangement, the performing of all of the aforementioned machining operations while the assembly remains clamped in the same fixture. To this end, the yoke may be provided with a locating rib 65 (Fig. 9) on the rear sides of its arms 19, and the jaws 45a may be adapted to be engaged against these ribs 65, leaving the side faces 62 of the yoke free to be machined. By adding one or more stations to the machining apparatus, the extra operations of machining the side faces 62 and milling the slots 63 may be performed with the assembly mounted on the same apparatus on which the turning operations previously described are performed.

It will be apparent from the foregoing that the invention provides a method of processing propeller assemblies, wherein the welding of the yokes to the propeller tube is accomplished with a maximum of accuracy of centering the yokes with respect to the tube, wherein the machining is performed subsequently to the welding so as to eliminate and correct for errors introduced by the welding operation, wherein the locating of the assembly with respect to the cutting tools is performed by locating against the cylindrical surface of the maximum diameter of the tube, and wherein the machining operations are all performed in such a manner that all of the machined surfaces will be concentric with the axis of the major portion of the tube. It will be noted further that the invention provides for locating the tubes without setting up distortion therein, and for supporting the part that is engaged by the tools, against springing away from the tool during the machining operation, such supporting being carried out in a manner such as to avoid setting up of distortional strains between the supporting means and the locating jaws, either during the operating of adjusting the jaws to the surfaces to be supported, or during the machining operation. As a result, the work comes from the apparatus, with the machined surfaces all perfectly concentric with the axis of the major portion of the tube, and a maximum degree of balance is thereby incorporated into the finished shaft, reducing or eliminating the necessity for a subsequent balancing operation.

I claim:

1. The steps in the method of manufacturing tubular motor vehicle propeller shafts, comprising: first selecting a length of tubing to form the shaft, then swaging an end region of the tube to a reduced diameter, then forming the end of said reduced portion with an internal frusto-conical locating surface; providing a fitting having a frusto-conical exterior locating surface, supporting the fitting and tube with said frusto-conical surfaces in contact with each other under axial pressure so as to cause the fitting to be centered with reference to the tube, then welding the fitting and tube together at the locating surfaces, then locating the shaft with the axis of the external surface of its major diameter in alignment with the axis of a rotary cutting tool, and subsequently machining the fitting by means of said tool to produce surfaces thereon that are coaxial with said axis.

2. The steps in the method of manufacturing motor vehicle propeller shafts comprising: selecting a suitable length of tubing to form the shaft, straightening the shaft, reducing an end region of the shaft by a swaging process, then welding a universal joint yoke to said reduced end of the shaft, and subsequently machining the yoke with reference to the major axis of the shaft and without reference to the axis of the yoke, so as to produce surfaces that are coaxial and substantially accurate with said major axis.

3. The steps in the method of manufacturing a motor vehicle propeller shaft assembly including a tubular shaft portion that is reduced at its end and a universal joint yoke welded to said reduced end, comprising: selecting a suitable length of tubing to form a shaft, reducing one end portion thereof, supporting the welded tube and yoke assembly for operation upon the yoke by a rotary cutting tool, in a fixture which engages the exterior surface of the major diameter of the tube so as to locate the axis of said exterior surface in exact alignment with the axis of said tool, and subsequently shifting the tool axially into engagement with the yoke and thereby machining surfaces on said yoke which are coaxial with said major diameter.

4. The steps in the method of manufacturing a motor vehicle propeller shaft assembly including a tubular shaft and a universal joint yoke welded thereto, comprising: selecting a suitable length of tubing to form a shaft, reducing one end portion thereof by a swaging process, forming said end portion with an interior beveled locating surface, forming a yoke assembly by a die stamping operation in which the hub portion of the fitting is provided with an external beveled locating surface adapted to register with said locating surface of the tube, supporting the fitting and tube with said locating surfaces in contact under axial pressure so as to cause the fitting and tube to locate with respect to each other, welding the fitting and tube at the locating surfaces, supporting the welded tube and yoke assembly in a fixture which engages the exterior cylindrical surface of the tube so as to locate the axis of said cylindrical surface in exact alignment with that of said tool, and bringing the tool and yoke into engagement with each other so as to machine surfaces on the yoke that are coaxial and accurate with said cylindrical surface.

5. The steps in the method of manufacturing a motor vehicle propeller shaft assembly including a tubular shaft portion and a universal joint yoke welded to an end thereof, comprising: supporting the assembly for operation upon the yoke by a cutting tool, in a fixture which engages the exterior surface of the tube with a sufficiently light pressure to avoid setting up distortion therein, and bringing the tool and yoke into engagement with each other and causing one to rotate with reference to the other so as to machine surfaces upon said yoke which are coaxial and accurate in relation to the said exterior surface of the tube.

6. The steps in the method of manufacturing a motor vehicle propeller shaft assembly including a tubular shaft portion and a universal joint yoke welded to an end thereof, comprising: locating the welded tube and yoke assembly with reference to a cutting tool, in a fixture which engages the exterior surface of the tube so as to locate the axis of said surface in exact alignment with the axis of the tool, under pressure which is sufficiently light to avoid setting up distortion in the tube, subsequently adjusting a supporting member into contact with the yoke for supporting the yoke against the pressure on the tool, and subsequently bringing the tool and yoke into working engagement with each other for machining surfaces on the yoke that are coaxial and true with said locating surface of the tube.

7. The steps in the method of manufacturing a motor vehicle propeller shaft assembly including a tubular shaft portion that is reduced at its end and a universal joint yoke welded to said reduced end, comprising: selecting a suitable length of tubing to form a shaft, reducing one end portion thereof, welding a yoke to said reduced end portion, supporting a welded tube and yoke assembly for operation upon the yoke by a rotary cutting tool, in a fixture which engages the exterior surface of the major diameter of the tube so as to locate the axis of said exterior surface in exact alignment with the axis of said tool, and subsequently bringing the tool and yoke into engagement with each other so as to machine surfaces on the yoke that are coaxial and accurate with reference to said exterior surface.

CARL E. SWENSON.